(12) United States Patent
Priess et al.

(10) Patent No.: US 12,330,466 B2
(45) Date of Patent: Jun. 17, 2025

(54) HEIGHT-LEVEL ADJUSTMENT SYSTEM FOR A CHASSIS OF A MOTOR VEHICLE

(71) Applicants: thyssenkrupp Bilstein GmbH, Ennepetal (DE); thyssenkrupp AG, Essen (DE)

(72) Inventors: Jens Priess, Oberhausen (DE); Daniel Petrus Johannes Klabbers, Rees (NL)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 0 days.

(21) Appl. No.: 18/768,813

(22) Filed: Jul. 10, 2024

(65) Prior Publication Data

US 2025/0018763 A1 Jan. 16, 2025

(30) Foreign Application Priority Data

Jul. 11, 2023 (DE) ...................... 10 2023 118 270.6

(51) Int. Cl.
*B60G 17/02* (2006.01)

(52) U.S. Cl.
CPC ...... *B60G 17/021* (2013.01); *B60G 2204/124* (2013.01)

(58) Field of Classification Search
CPC .... B60G 15/063; B60G 17/021; B60G 11/16; B60G 2204/4191; B60G 2204/418; B60G 2202/12; B60G 2204/1242; B60G 2204/124; B60G 2202/42; H02K 7/06; H02K 7/14

See application file for complete search history.

(56) References Cited

U.S. PATENT DOCUMENTS

| | | | |
|---|---|---|---|
| 4,744,444 A * | 5/1988 | Gillingham | F16F 9/44 267/221 |
| 4,787,526 A | 11/1988 | Pehr | |
| 4,809,874 A | 3/1989 | Pehr | |
| 4,830,395 A * | 5/1989 | Foley | B60G 17/0272 280/124.162 |
| 4,898,073 A | 2/1990 | Seip et al. | |
| 4,925,041 A | 5/1990 | Pehr | |
| 5,013,073 A | 5/1991 | Pehr | |
| 5,137,260 A | 8/1992 | Pehr | |

(Continued)

FOREIGN PATENT DOCUMENTS

| | | |
|---|---|---|
| DE | 37 40 691 A1 | 6/1989 |
| DE | 10 2007 051 971 A1 | 5/2009 |

(Continued)

*Primary Examiner* — Toan C To
(74) *Attorney, Agent, or Firm* — thyssenkrupp North America, LLC

(57) ABSTRACT

A height-level adjustment system for a chassis of a motor vehicle comprises a spring and a spring seat against which the spring lies at one end, the spring seat including a threaded sleeve which is attached coaxially with respect to the spring and has an external thread and a threaded ring, which is attached to the threaded sleeve, with an internal thread which interacts with the external thread of the threaded sleeve, wherein the spring seat has a connecting element which is attached to the threaded sleeve for connecting the spring seat to the body of a motor vehicle.

16 Claims, 3 Drawing Sheets

(56) References Cited

U.S. PATENT DOCUMENTS

| | | | | |
|---|---|---|---|---|
| 5,477,948 A | * | 12/1995 | Stevens | B60G 17/021 |
| | | | | 267/221 |
| 12,077,028 B2 | * | 9/2024 | Smith | B60G 15/065 |
| 2002/0038929 A1 | * | 4/2002 | Now | B60G 17/021 |
| | | | | 267/217 |
| 2009/0108546 A1 | | 4/2009 | Ohletz et al. | |
| 2013/0200589 A1 | * | 8/2013 | Cox | B60G 17/0272 |
| | | | | 267/218 |
| 2020/0001677 A1 | * | 1/2020 | Blankson | B60G 15/065 |
| 2020/0361267 A1 | * | 11/2020 | Ricketts | B60G 15/063 |
| 2020/0377168 A1 | * | 12/2020 | Kubotera | B60G 15/063 |
| 2021/0276385 A1 | * | 9/2021 | Smith | B60G 15/065 |
| 2021/0300139 A1 | * | 9/2021 | D'Orazio | F16F 9/38 |
| 2022/0001714 A1 | * | 1/2022 | Blankson | B60G 17/021 |
| 2022/0161626 A1 | * | 5/2022 | Hwang | B60G 17/0157 |
| 2024/0066939 A1 | * | 2/2024 | Jeong | F16H 25/20 |
| 2024/0131890 A1 | * | 4/2024 | Blankson | B60G 21/0551 |

FOREIGN PATENT DOCUMENTS

| | | |
|---|---|---|
| DE | 10 2011 090 089 A1 | 7/2013 |
| EP | 3 959 088 A1 | 3/2022 |
| JP | 3 069 189 U | 6/2000 |

\* cited by examiner

HEIGHT-LEVEL ADJUSTMENT SYSTEM FOR A CHASSIS OF A MOTOR VEHICLE

CROSS REFERENCE TO RELATED APPLICATION

This application is a U.S. Non-Provisional that claims priority to German Patent Application No. DE 10 2023 118 270.6, filed Jul. 11, 2023, and the entire content of which is incorporated herein by reference.

FIELD

The disclosure relates to a height-level adjustment system for a chassis of a motor vehicle.

BACKGROUND

To adjust the height level of a chassis of a motor vehicle, the distance between the body and the wheel suspension is usually adjusted. A supporting spring is usually arranged between these components, for example together with a shock absorber. To adjust the height level of the chassis, a spring seat is usually designed to be adjustable relative to the chassis. The spring seat is, for example, attached to the wheel suspension or to the body and is designed according to the installation position or the type of motor vehicle in such a way that fastening is possible. The adaptation of the spring seat to the installation position or the type of motor vehicle requires a very costly production of the spring seat. Such a spring seat is described, for example, in EP 3 959 088 B1.

Thus a need exists to provide a height-level adjustment system for a chassis of a motor vehicle that can be produced simply and cost-effectively and is attachable to different types of vehicle and installation positions.

BRIEF DESCRIPTION OF THE FIGURES

Further advantageous features and details of the disclosure will be explained in more detail in the context of the embodiments illustrated in the figures, in which.

DETAILED DESCRIPTION

Figure 1:
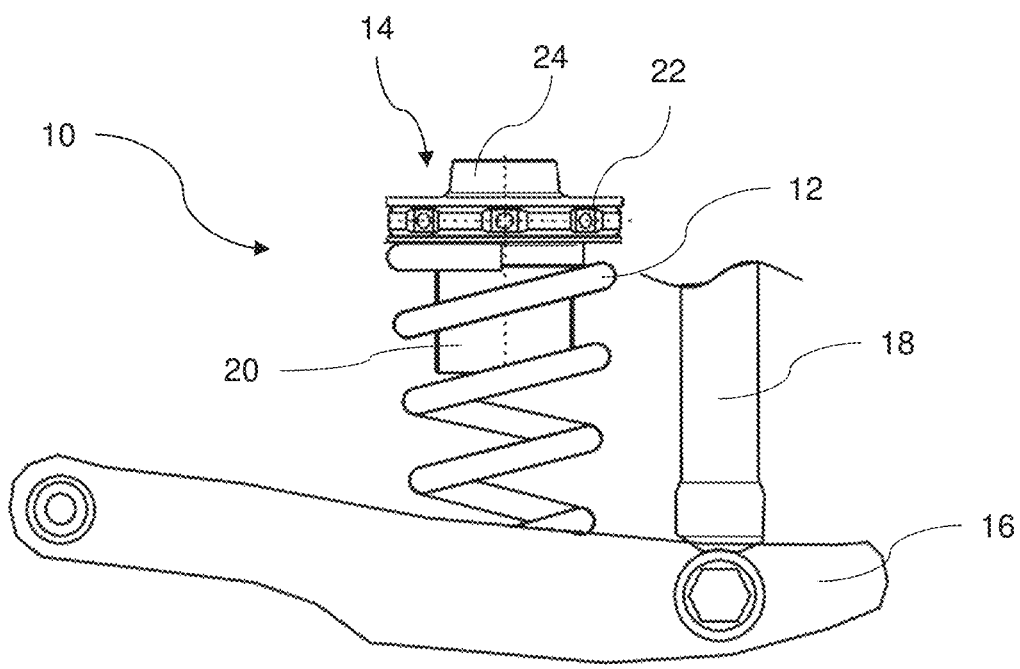
FIG. 1 shows a schematic illustration of a height-level adjustment system for a chassis of a motor vehicle in a view from the rear according to one embodiment.

In some embodiments, a device comprises a height-level adjustment system for a chassis of a motor vehicle, having a spring, a spring seat against which the spring lies at one end, the spring seat comprising: a threaded sleeve which is attached coaxially with respect to the spring and has an external thread, and a threaded ring, which is attached to the threaded sleeve, with an internal thread which interacts with the external thread of the threaded sleeve. The spring seat has a connecting element which is attached to the threaded sleeve for connecting the spring seat to the body of a motor vehicle.

For example, the height-level adjustment system has one or two spring seats, which are each connected to a respective end of the spring. In particular, at least one spring seat is attached to the vehicle body or to an element of the wheel suspension. For example, one end of the spring is attached to a spring seat which is connected to a structural element of the wheel suspension, such as the transverse link or wheel carrier, for example. Preferably, the spring is designed as a helical spring and in particular has a plurality of coils. In particular, the spring has a constant inner diameter and/or outer diameter. For example, the spring ends have the same inner diameter, with the central region of the spring having a larger inner diameter. For example, the height-level adjustment system comprises a vibration damper, which is preferably attached mechanically parallel to the spring. The vibration damper is preferably attached to the vehicle body and/or to an element of the wheel suspension. Preferably, only the connecting element is connectable to the vehicle body by the spring seat. In particular, the threaded sleeve is not directly connectable or connected to the vehicle body.

The spring seat comprises in particular a threaded sleeve, which preferably extends coaxially with respect to the spring. The inner diameter of the spring is preferably greater than or equal to the outer diameter of the threaded sleeve, and therefore the spring is attached circumferentially around the threaded sleeve. The threaded sleeve preferably extends from one end of the spring along the central centre axis into the latter, preferably over approx. 25%-50%, in particular 30% to 40% of the axial length of the spring, which is preferably in the inoperative position. The threaded sleeve has, by way of example, an external thread, which is preferably formed at least partially or on the entire outer circumferential surface of the threaded sleeve.

The spring seat furthermore comprises a threaded ring against which preferably one end of the spring lies. The threaded ring preferably has a radially extending surface which faces in the direction of the spring and against which the spring lies such that the threaded ring forms an axial stop of the spring. The threaded ring preferably has an internal thread which is formed at least partially or on the entire inner surface of the threaded ring. The threaded ring is preferably formed in a circular ring, with the internal thread of the threaded ring interacting in particular with the external thread of the threaded sleeve to form a screw connection. Preferably, the threaded sleeve is attached in a stationary manner, with the threaded ring being attached movably in the axial direction relative to the threaded sleeve such that the axial position of the threaded ring on the threaded sleeve is adjustable, in particular manually or automatically. A change in the position of the threaded ring on the threaded sleeve preferably leads to a change in the preloading of the spring and/or to a change in the distance of the wheel suspension from the body.

The spring seat furthermore preferably comprises a connecting element for connecting the threaded sleeve to the vehicle body. The connecting element and the threaded sleeve and the threaded ring are preferably designed as separate components. Preferably, only the connecting element is formed for connecting the spring seat to the vehicle body. This affords the advantage that the connecting element can be easily and cost-effectively adapted to the geometry of the respective vehicle body without having to design the entire spring seat differently for each vehicle model.

According to a first embodiment, the connecting element is formed from a plastic. The plastic is, for example, PA6 GF50 or PA6.6 GF50, preferably glass-fibre-reinforced or carbon-fibre-reinforced plastic. Preferably, the connecting element is completely formed from a plastic. For example, the connecting element is formed from a composite material consisting of a plastic and glass fibre. In particular, the connecting element is formed from a material which comprises a proportion of 15% to 70%, in particular 30% to 60% of carbon fibre and/or glass fibre, with preferably the remaining material being partially or completely formed from a plastic. The connecting element is preferably produced by means of an injection-moulding process. A configuration of the connecting element made from a plastic affords a cost-effective production option, whereby only the connecting element, but not the complete spring seat, is produced from the plastic.

According to another embodiment, the threaded sleeve and/or the threaded ring are formed from a metal. The threaded sleeve and/or the threaded ring are formed, for example, from steel or aluminium. For example, the threaded sleeve and/or the threaded ring are formed from a plastic.

According to a further embodiment, the connecting element is connected in a positionally fixed manner to the threaded sleeve, in particular by means of a press connection. Preferably, the connecting element is fixedly connected to the threaded sleeve, in particular with a form fit, force fit and/or substance-to-substance bond. For example, the connecting element is connected to the threaded sleeve by means of a press connection. Preferably, the connection between the threaded sleeve and the connecting element cannot be released non-destructively.

According to a further embodiment, the connecting element has a first region, which is arranged completely or partially within the threaded sleeve. Preferably, the first region together with the threaded sleeve forms the press connection. In particular, the connecting element is fastened to the threaded sleeve exclusively via the first region. The connecting element is preferably substantially sleeve-shaped, in particular in the form of a hollow cylinder. The first region of the connecting element is in particular in the form of a hollow cylinder and is arranged completely or partially within the threaded sleeve. The first region preferably has an outer diameter which is slightly larger than the inner diameter of the threaded sleeve, and therefore a press connection is formed between the threaded sleeve and the connecting element, in particular the first region of the connecting element. The first region of the connecting element preferably has an inner diameter and/or outer diameter which is constant over the axial length.

According to a further embodiment, the connecting element has a flange region, which forms a contact surface for the threaded ring. The flange region is preferably fixedly connected to the first region of the connecting element and formed in particular in one piece or integrally therewith. The flange region preferably has a larger outer diameter than the first region of the connecting element. The flange region preferably adjoins the body-side end of the first region of the connecting element and extends preferably beyond the threaded sleeve in the axial and radial direction. The flange region preferably has an axial surface which faces in the direction of the spring and extends radially over the threaded sleeve and in particular forms a contact surface for the threaded ring. The flange region preferably forms an axial stop for the threaded ring.

According to a further embodiment, the connecting element has a second region which has an inner diameter which is smaller than the inner diameter of the first region of the connecting element. The second region is preferably sleeve-shaped, in particular is in the form of a hollow cylinder, and preferably extends coaxially with respect to the first region and the flange region. The second region preferably extends out of the threaded sleeve at least partially or completely in the axial direction. Preferably, the second region adjoins the flange region directly in the axial direction. In particular, the second region has an inner diameter which is smaller than the inner diameter of the first region, the flange region and the inner diameter of the threaded sleeve. The second region optionally has an outer diameter which is smaller than the outer diameter of the first region, the flange region and the outer diameter of the threaded sleeve. The second region preferably directly adjoins the end region of the first region facing away from the spring and extends, for example, at least partially within the threaded sleeve. Preferably, the second region has an inner diameter and/or outer diameter which is constant over the axial extent.

The second region is preferably designed for connecting the spring seat, in particular the connecting element, to the vehicle body, such that the vehicle body is preferably exclusively connected directly to the second region of the connecting element.

According to a further embodiment, the connecting element is preferably formed in one piece or integrally.

According to a further embodiment, the connecting element is formed in multiple parts. In particular, the first region of the connecting element is designed as a separate component from the second region of the connecting element. For example, the first region is formed integrally or in one piece with the flange region. This affords the advantage that the geometry of the second region can be adapted to the geometry of the vehicle body of the respective type of vehicle without also having to adapt the first region thereto. This significantly reduces the production costs of the connecting element.

According to a further embodiment, the first region and the second region of the connecting element are connected to each other by means of a non-destructively releasable connection. Preferably, the releasable connection is designed in such a way that the first region and the second region of the connecting element are non-destructively separable from each other. The releasable connection is, for example, a form-fitting, force-fitting and/or substance-to-substance bonded connection, in particular a snap connection, latching connection, clip connection, screw connection or adhesive connection. For example, the first region and the second region of the connecting element are connected to each other by means of a non-releasable, in particular not non-destructively releasable, connection. The non-releasable, in particular not non-destructively releasable, connection is, for example, a press connection and or a connection by friction welding and/or ultrasonic welding.

The releasable connection of the first region and the second region of the connecting element preferably comprises two connecting regions, which are arranged in particular spaced apart from each other. At least one of the connection regions is preferably designed as a snap connection with at least two snap hooks. For this purpose, for example, the first region of the connecting element has at least one or a plurality of projections formed on the inner surface of the first region and facing radially inwards, in particular snap hooks. The second region has, for example, a projection which is formed on the outer surface of the second region and is preferably formed in a complementary manner to the projection of the first region. The projections of the first and second regions preferably lie against each other in such a way that they form a snap connection.

According to a further embodiment, the second region has a spring element which is designed and arranged in such a way that it applies an axial spring force to the second region. The spring element is, for example, a portion of the second region, which is formed from a plastically, reversibly deformable material. The spring element is preferably designed as a radially outward facing projection of the second region. The spring element is preferably formed on the outer surface of the second region and in particular has a triangular cross section. The spring element preferably has a contact surface which faces in the axial direction with respect to the threaded sleeve and in particular lies against the inner surface of the flange region. The spring element and the projection of the second region are preferably arranged axially spaced apart from each other. To fasten the second region to the first region of the multi-part connecting element, the second region is preferably moved axially from above into the first region such that the projection of the second region is moved in the axial direction beyond the projection of the first region, and the spring element lies against the recess in the inner surface of the flange region. Preferably, the spring element is designed and arranged in such a way that it applies a spring force to the second region in the axial direction away from the spring. This results in a secure connection between the projections of the first region and the second region.

According to a further embodiment, the connecting region has a undercut, which is formed by means of the press connection of the threaded sleeve to the connecting element. In particular, the undercut is designed as a recess and preferably formed in the first region or in the flange region of the connecting element. The undercut is preferably formed at the transition between the flange region and the first region.

The connection of the threaded sleeve to the connecting element is preferably designed as a press connection, wherein the threaded sleeve is pressed onto the connecting element, which is formed from a plastic. During the pressing process, a plastic chip is removed from the connecting element, the removal process resulting in the undercut.

According to a further embodiment, the connecting element has, on the outer surface, a plurality of ribs which extend in the axial direction. Preferably, the first region and/or the second region of the connecting element each have a ribbed surface formed on the outer surface. Preferably, a plurality of ribs extending in the axial direction are formed on the outer surface of the first region and/or the second region. The ribs preferably extend parallel to each other and are in particular all or partially identical. Preferably, the ribs have a width which extends in the circumferential direction and increases, in particular continuously, in the direction of the flange region. This permits the formation of a press connection, preferably between the first region and the threaded sleeve and/or between the second region and the vehicle body, in a simple manner.

FIG. 1 shows a height-level adjustment system for a chassis of a motor vehicle. The height-level adjustment system 10 comprises, for example, a spring 12, which is preferably designed as a helical (compression) spring or frustoconical spring and in particular has a plurality of coils. Preferably, the spring 12 has a constant inner diameter and/or outer diameter. Furthermore, the height-level adjustment system 10 comprises a spring seat 14, against which the spring 12 lies at its one end. The spring is attached in particular in such a way that both ends are each attached to a respective spring seat, the second spring seat not being illustrated in FIG. 1. Preferably, the second spring seat, not illustrated, is not adjustable or is formed identically to the spring seat 14, which is described below.

The spring seat 14 is preferably attachable to the vehicle body, which is not illustrated in FIG. 1. By way of example, an element 16 of the wheel suspension, such as a transverse link, for example, is shown in FIG. 1, to which, by way of example, a vibration damper 18 is attached. The spring 12 is preferably also attached to the wheel suspension and in particular connected mechanically parallel to the vibration damper 18. The spring seat 14 comprises, for example, a threaded sleeve 20, which extends coaxially with respect to the spring 12. By way of example, the inner diameter of the spring 12 is greater than or has the same diameter as the outer diameter of the threaded sleeve, and therefore the spring 12 is attached circumferentially around the threaded sleeve 20. The threaded sleeve 20 preferably extends from one end of the spring 12 along the central centre axis into the latter, preferably over approx. 25%-50%, in particular 30% to 40%, of the axial length of the spring 12. The threaded sleeve 20 has, by way of example, an external thread, which is preferably formed at least partially or on the entire outer circumferential surface of the threaded sleeve.

The spring seat 14 furthermore comprises a threaded ring 22, against which the end of the spring 12 lies. The threaded ring 22 is also referred to, for example, as a spring plate and preferably has an internal thread which is formed at least partially or on the entire inner surface of the threaded ring 22. The threaded ring 22 is preferably formed in a circular ring, with the internal thread of the threaded ring 22 interacting in particular with the external thread of the threaded sleeve 20 to form a screw connection. By way of example, the threaded ring 22 has a radially extending surface which faces in the direction of the spring 12 and against which the spring 12 lies such that the threaded ring 22 forms an axial stop of the spring 12. Preferably, the threaded sleeve 20 is attached in a stationary manner, with the threaded ring 22 being attached movably in the axial direction relative to the threaded sleeve 20 such that the axial position of the threaded ring 22 on the threaded sleeve 20 is adjustable. A change in the position of the threaded ring 22 on the threaded sleeve preferably leads to a change in the preloading of the spring 12 and/or to a change in the distance of the wheel suspension from the body.

The spring seat 14 furthermore preferably comprises a connecting element 24 for connecting the threaded sleeve 20 to the vehicle body. The connecting element 24 is preferably formed from a plastic. Preferably, the plastic is a glass-fibre-reinforced or carbon-fibre-reinforced plastic. In particular, the connecting element 24 is formed from a material which comprises a proportion of 15% to 70%, in particular 30% to 60% of glass fibre, with preferably the remaining material being partially or completely formed from a plastic. The connecting element 24 is preferably produced by means of an injection-moulding process.

The threaded sleeve 20 and/or the threaded ring 22 is preferably formed from a metal, in particular steel or aluminium. Preferably, the connecting element 24 is fixedly connected to the threaded sleeve 20, in particular with a form fit, force fit and/or substance-to-substance bond. For example, the connecting element 24 is connected to the threaded sleeve 20 by means of a press connection.

Figure 2:
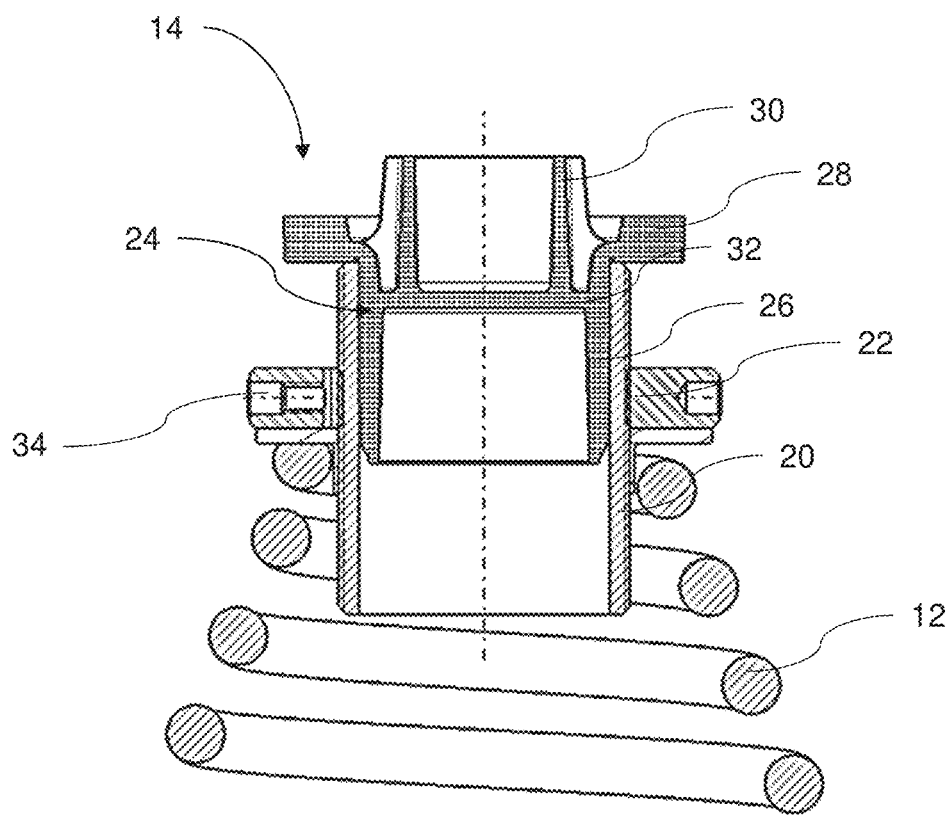
FIG. 2 shows a schematic illustration of a height-level adjustment system in a longitudinal sectional view according to a further embodiment.

FIG. 2 shows a detailed illustration of the spring seat 14 of FIG. 1, the same elements being provided with the same reference signs. The connecting element 24 is, by way of example, substantially sleeve-shaped, in particular in the form of a hollow cylinder. Preferably, the connecting element 24 has a first hollow-cylindrical region 26, which is arranged completely or partially within the threaded sleeve 20. By way of example, the first region 26 has an outer diameter which is slightly larger than the inner diameter of the threaded sleeve 20, and therefore a press connection is formed between the threaded sleeve 20 and the connecting element 24, in particular the first region 26 of the connecting element 24. The first region 26 of the connecting element 24 preferably has an inner diameter and/or outer diameter which is constant over the axial length.

The connecting element 24 has, by way of example, a flange region 28 which is attached to the first region 26 of the connecting element 24 and has a larger outer diameter than the first region 26 of the connecting element 24. The flange region 28 preferably adjoins the body-side end of the first region 26 of the connecting element 24 and extends preferably beyond the threaded sleeve 20 in the axial and radial direction. The flange region 28 preferably has an axial surface which faces in the direction of the spring and extends radially over the threaded sleeve and in particular forms a contact surface for the threaded ring 22.

The connecting element 24 has, by way of example, a second sleeve-shaped, in particular hollow-cylindrical, region 30, which preferably extends coaxially with respect to the first region 26 and the flange region 28. The second region 28 preferably extends out of the threaded sleeve 20 at least partially or completely in the axial direction. In particular, the second region 30 has an inner diameter which is smaller than the inner diameter of the first region 26, the flange region 28 and the inner diameter of the threaded sleeve 20. By way of example, the second region 30 has an outer diameter which is smaller than the outer diameter of the first region 26, the flange region 28 and the outer diameter of the threaded sleeve 20. The second region 30 preferably adjoins the end region of the first region 26 facing away from the spring 12 and extends, for example, at least partially within the threaded sleeve 20. The outer diameter of the second region 30 is preferably spaced apart from the inner diameter of the first region 26 and/or the inner diameter of the flange region 28, such that an annular space is formed, in particular, between the second region 30 and the first region 26 and the flange region 28.

Preferably, the second region 30 has an inner diameter and/or outer diameter which is constant over the axial extent. A base disc 32, by way of example, is arranged between the first and the second region 26, 30 and is in particular disc-shaped and extends over the entire diameter of the connecting element 24. The base disc 32 preferably forms an axial separation of the first region 26 from the second region 30 of the connecting element 24. The connecting element 24 is preferably formed in one piece or integrally.

The threaded ring preferably has an anti-rotation device 34 known from the prior art.

Figure 3:
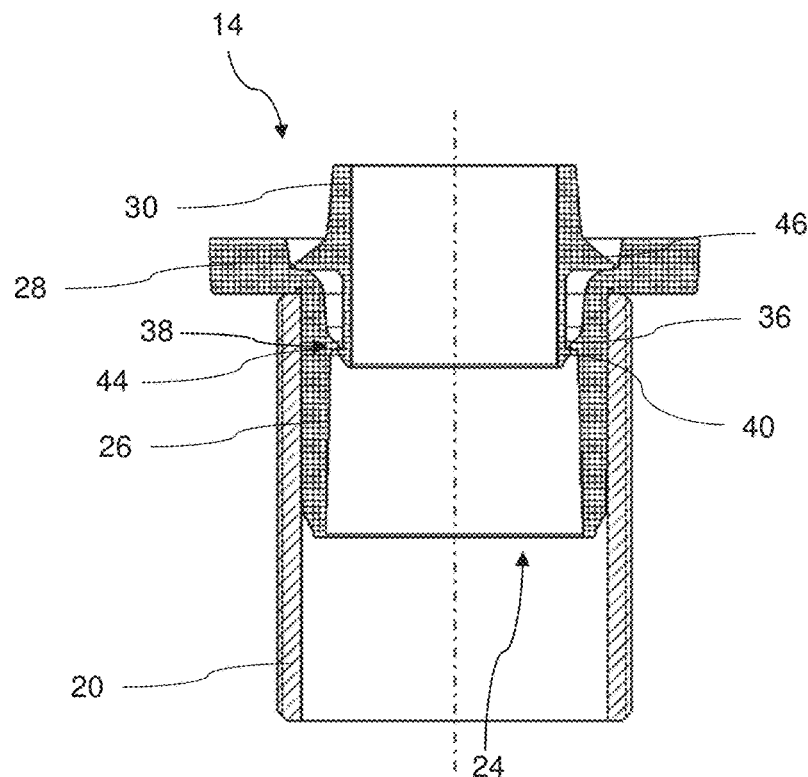
FIG. 3 shows a schematic illustration of a spring seat in a longitudinal sectional view according to a further embodiment.

FIG. 3 shows another exemplary embodiment of a spring seat 14, wherein the latter, in contrast to the spring seat 14 of FIG. 2, has a two-part connecting element 24. The first region 26 of the connecting element 24 is designed as a separate component from the second region 30 of the connecting element 24. By way of example, the second region 30 is connected to the first region 26 by means of a releasable connection. Preferably, the releasable connection is designed in such a way that the first region 26 and the second region 30 of the connecting element 24 are non-destructively separable or not non-destructively separable from each other. The releasable connection is, for example, a form-fitting, force-fitting and/or substance-to-substance bonded connection, in particular a latching connection, clip connection, screw connection or adhesive connection.

The releasable connection of the first region 26 and the second region 30 of the connecting element 24 comprises, by way of example, two connecting regions, which are arranged in particular spaced apart from each other. The first connecting region 38 is designed, by way of example, as a snap connection with at least two snap hooks.

The first region 26 of the connecting element 24 has, by way of example, at least one or a plurality of projections 36, in particular snap hooks, formed on the inner surface of the first region 26 and facing radially inwards. The projection 36 is preferably annular and extends in particular over the entire inner circumference of the first region 26 of the connecting element 24. By way of example, the projection 36 has a triangular cross section. In particular, the projection 36 is formed in such a way that it forms a contact surface 42 preferably facing in the axial direction with respect to the spring 12. The second region 30 has, by way of example, a projection 40 which is formed on the outer surface of the second region 30 and is preferably formed in a complementary manner to the projection 36 of the first region 26. The projection 40 of the second region 30 preferably has a contact surface 44 which faces away from the spring 12 in the axial direction and in particular lies against the contact surface 42 of the first region 26. The projection 36 of the first region 26 and the projection 40 of the second region 30 preferably form a snap connection.

The second region 30 has, by way of example, a spring element 46 designed as a radially outwardly facing projection. The spring element 46 is preferably formed on the outer surface of the second region 30 and in particular has a triangular cross section. The spring element 46 preferably has a contact surface which faces in the axial direction with respect to the threaded sleeve 20 and, by way of example, lies against the inner surface of the flange region 28. By way of example, a recess which is formed in a complementary manner to the contact surface of the spring element 46 and in which the spring element 46 is received is provided on the inner surface of the flange region 28. The spring element 46 and the projection 40 of the second region 30 are preferably arranged axially spaced apart from each other.

To fasten the second region 30 to the first region 26 of the connecting element 24, the second region is preferably moved axially from above into the first region such that the projection of the second region 30 is moved in the axial direction beyond the projection 36 of the first region 26, and the spring element 46 lies against the recess in the inner surface of the flange region 28. Preferably, the spring element 46 is designed and arranged in such a way that it applies a spring force to the second region in the axial direction away from the spring 12. This leads to a secure connection of the projections 36, 40 of the first region 26 and the second region 30. The spring element 46 is preferably formed from a plastically, reversibly deformable material.

Figure 4:
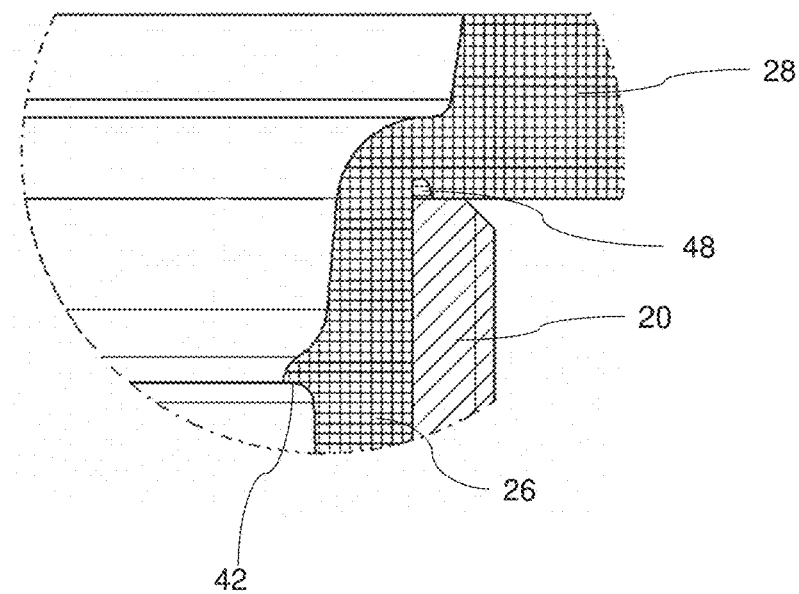
FIG. 4 shows a schematic illustration of a detail of a spring seat in a longitudinal sectional view according to a further embodiment.

FIG. 4 shows a view of a detail of the spring seat 14 of FIG. 3, identical elements being provided with the same reference signs. FIG. 4 merely shows the first region 26 of the connecting element 24 and the threaded sleeve 20. The first region 26 of the connecting element 24 is preferably fixedly connected to the threaded sleeve 20. In the mounted state which is shown in FIG. 4 and in which the connecting element 24 is connected to the threaded sleeve 20, the connecting element 24, in particular the first region 26 of the connecting element 24, has an undercut 48 in the form of a recess.

The connection of the threaded sleeve 20 to the connecting element 24 is preferably designed as a press connection, wherein the threaded sleeve 20 is pressed onto the connecting element 24, which is formed from a plastic. During the pressing process, a plastic chip is removed from the connecting element 24, the removal process resulting in the undercut 48. The undercut is preferably formed in the flange region 28, in particular at the transition between the flange region 28 and the first region 26. Preferably, the undercut 48 extends at least partially or completely in the circumferential direction. In particular, the undercut 48 is formed directly between the end side of the threaded sleeve 20 and the axial surface of the flange region 28 facing in the direction of the threaded sleeve 20.

Figure 5:
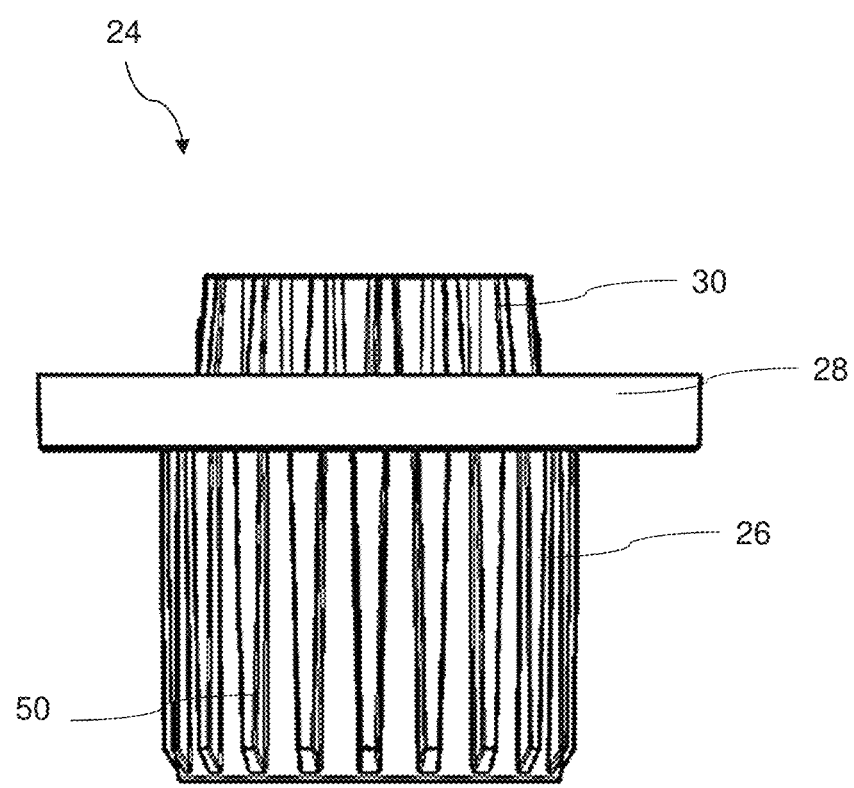
FIG. 5 shows a schematic illustration of a connecting element in a side view according to a further embodiment.

FIG. 5 shows the connecting element 24 in a side view, the connecting element 24 being formed, for example, integrally or in multiple parts. The first region 26 and the second region 30 of the connecting element 24 have, by way of example, a ribbed surface formed on the outer surface. Preferably, a plurality of ribs 50 extending in the axial direction are formed on the outer surface of the first region 26 and the second region 30. The ribs 50 preferably extend parallel to each other and are in particular all or partially identical. Preferably, the ribs 50 have a width which extends in the circumferential direction and increases, in particular continuously, in the direction of the flange region 28.

The second region 30 of the connecting element 24 is preferably designed such that it is connectable to the body of the vehicle. In particular, the second region 30 is designed to be connectable to the body of the vehicle by means of a plug-in connection or press connection.

LIST OF REFERENCE SIGNS

10 Height-level adjustment system
12 Spring
14 Spring seat
16 Element of the wheel suspension
18 Vibration damper
20 Threaded sleeve
22 Threaded ring
24 Connecting element
26 First region of the connecting element
28 Flange region
30 Second region of the connecting element
32 Base disc
34 Anti-rotation device
36 Projection
38 First connecting region
40 Projection
42 Contact surface of the first region 26
44 Contact surface of the second region 30
46 Spring element
48 Undercut
50 Rib

What is claimed is:

1. A height-level adjustment system for a chassis of a motor vehicle, comprising:
a spring; and
a spring seat against which the spring lies at one end, the spring seat including:
a threaded sleeve which is attached coaxially with respect to the spring and has an external thread; and
a threaded ring, which is attached to the threaded sleeve, with an internal thread which interacts with the external thread of the threaded sleeve;
wherein the spring seat has a connecting element which is attached to the threaded sleeve for connecting the spring seat to a body of a motor vehicle;
wherein the connecting element has an undercut, which is formed by a press connection of the threaded sleeve to the connecting element.

2. The height-level adjustment system according to claim 1, wherein the connecting element is formed from a plastic.

3. The height-level adjustment system according to claim 1, wherein the threaded sleeve and/or the threaded ring are formed from a metal.

4. The height-level adjustment system according to claim 1, wherein the connecting element is connected in a positionally fixed manner to the threaded sleeve by a press connection.

5. The height-level adjustment system according to claim 1, wherein the connecting element has a first region, which is arranged completely or partially within the threaded sleeve.

6. A height-level adjustment system for a chassis of a motor vehicle, comprising:
a spring; and
a spring seat against which the spring lies at one end, the spring seat including:
a threaded sleeve which is attached coaxially with respect to the spring and has an external thread; and
a threaded ring, which is attached to the threaded sleeve, with an internal thread which interacts with the external thread of the threaded sleeve;
wherein the spring seat has a connecting element which is attached to the threaded sleeve for connecting the spring seat to a body of a motor vehicle;
wherein the connecting element has a first region, which is arranged completely or partially within the threaded sleeve;
wherein the connecting element has a flange region, which forms a contact surface for the threaded ring.

7. The height-level adjustment system according to claim 6, wherein the connecting element has a second region which has an inner diameter which is smaller than the inner diameter of the first region of the connecting element.

8. The height-level adjustment system according to claim 7, wherein the connecting element is formed integrally or in one piece.

9. The height-level adjustment system according to claim 7, wherein the first region of the connecting element is designed as a separate component from the second region of the connecting element.

10. The height-level adjustment system according to claim 9, wherein the first region and the second region of the connecting element are connected to each other by a non-destructively releasable connection.

11. The height-level adjustment system according to claim 10, wherein the second region has a spring element which is designed and arranged in such a way that it applies an axial spring force to the second region.

12. A height-level adjustment system for a chassis of a motor vehicle, comprising:
a spring; and
a spring seat against which the spring lies at one end, the spring seat including:
a threaded sleeve which is attached coaxially with respect to the spring and has an external thread; and a threaded ring, which is attached to the threaded sleeve, with an internal thread which interacts with the external thread of the threaded sleeve;

wherein the spring seat has a connecting element which is attached to the threaded sleeve for connecting the spring seat to a body of a motor vehicle;

wherein an outer surface of the connecting element has a plurality of ribs which extend in the axial direction.

13. The height-level adjustment system according to claim 12, wherein the connecting element is formed from a plastic.

14. The height-level adjustment system according to claim 12, wherein the threaded sleeve and/or the threaded ring are formed from a metal.

15. The height-level adjustment system according to claim 12, wherein the connecting element is connected in a positionally fixed manner to the threaded sleeve by a press connection.

16. The height-level adjustment system according to claim 12, wherein the connecting element has a first region, which is arranged completely or partially within the threaded sleeve.

* * * * *